Sept. 5, 1950    A. E. POLLOCK    2,521,407
LIST FINDER
Filed June 17, 1947    5 Sheets-Sheet 1

INVENTOR
Albert E. Pollock
BY
Darby & Darby
Attorneys

Sept. 5, 1950 A. E. POLLOCK 2,521,407
LIST FINDER
Filed June 17, 1947 5 Sheets-Sheet 2
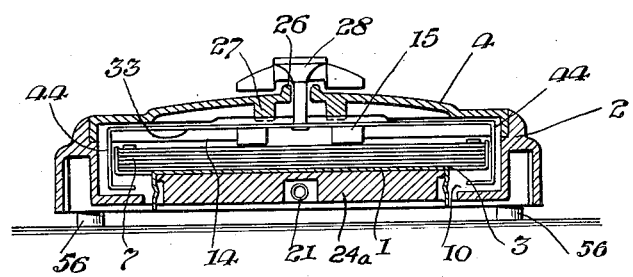
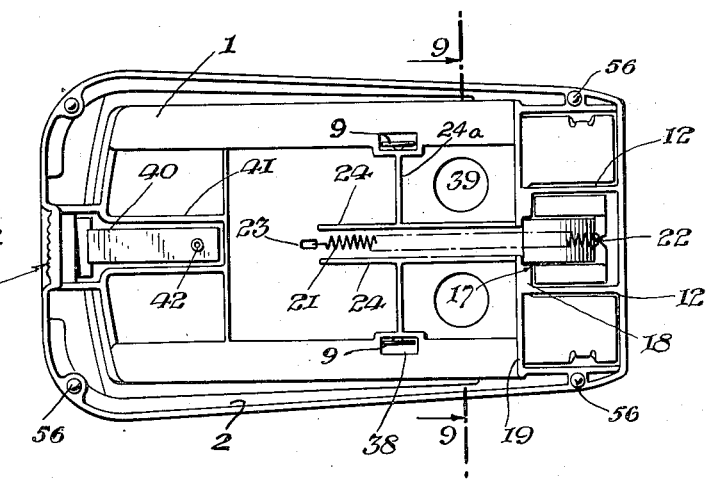
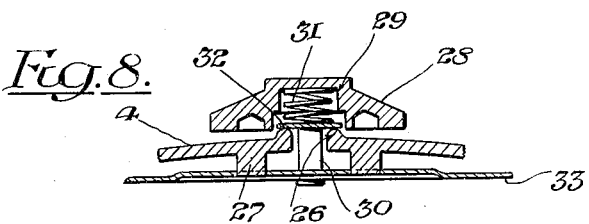
INVENTOR
Albert E. Pollock
BY
Darby & Darby
Attorneys Sept. 5, 1950  A. E. POLLOCK  2,521,407
LIST FINDER Filed June 17, 1947  5 Sheets-Sheet 3

INVENTOR
Albert E. Pollock
BY Darby + Darby
Attorneys

Sept. 5, 1950 A. E. POLLOCK 2,521,407
LIST FINDER
Filed June 17, 1947 5 Sheets-Sheet 4

INVENTOR.
Albert E. Pollock
BY Darby & Darby
Attorneys

Sept. 5, 1950　　　　A. E. POLLOCK　　　　2,521,407
LIST FINDER

Filed June 17, 1947　　　　　　　　　　5 Sheets-Sheet 5

INVENTOR
ALBERT E. POLLOCK
BY
ATTORNEYS

Patented Sept. 5, 1950

2,521,407

UNITED STATES PATENT OFFICE 2,521,407

LIST FINDER

Albert Edward Pollock, New York, N. Y.

Application June 17, 1947, Serial No. 755,160

15 Claims. (Cl. 40—104)

The present invention relates to list finders and particularly to that type of list finder in which a plurality of sheets are indexed and means are provided to automatically select any one of the index sheets.

More particularly still the invention relates to a list finder of the general type disclosed in my Patent No. 2,141,761 of December 27, 1938, and is an improvement upon that list finder. The improvement resides primarily in the fact that the index is given an enhanced appearance and that the assembly of the various parts is much more simply and economically performed.

It is an object of the invention to provide a list finder or automatically selectable index in which the parts are so arranged as to make the assembly extremely simple.

It is another object of the invention to provide an improved means for causing the cover of such an index to be spring biased to its open position.

It is a further object of the invention to provide a list finder of the type described in which the parts are simple and are extremely economically produced.

Other objects and features of the invention will be apparent when the following description is considered in connection with the annexed drawings in which:

Figure 5 is a side elevation of the holder and pad of Figure 4;

Figure 6 is a transverse vertical cross-section of the list finder of Figure 1 taken on the plane of the line 6—6 of Figure 3;

Figure 7 is a bottom plan view of the list finder of Figure 1;

Figure 8 is a detail cross-sectional view of the controlling button or knob showing the mode in which it is spring detented and held in selected position;

Figures 1, 2:
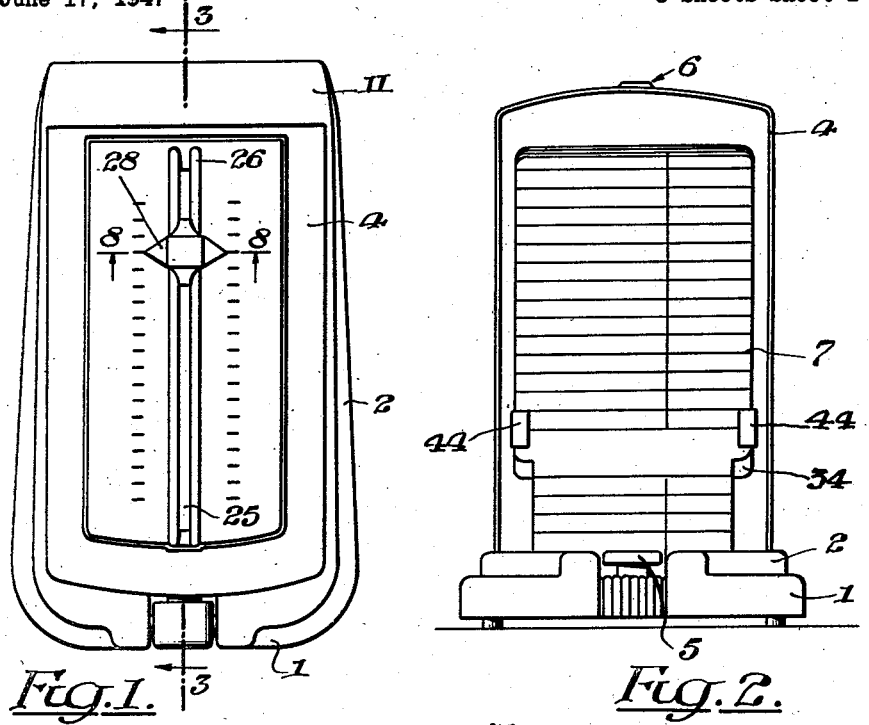
Figure 1 is a top plan view of the index of my invention.
Figure 2 is a front elevation of the index with the cover in its open position.

Referring to the drawings, the list finder of my present invention comprises a base 1. This base 1 is provided with a rim 2 and a central depression 3 (see Figure 6). The central well 3 is substantially rectangular in form.

Hinged to the base 1 in a manner hereinafter described is a cover 4, which cover is normally held in its closed position by means of a latch 5 which cooperates with a projection 6 at the forward end of the cover 4.

Figures 3, 4:
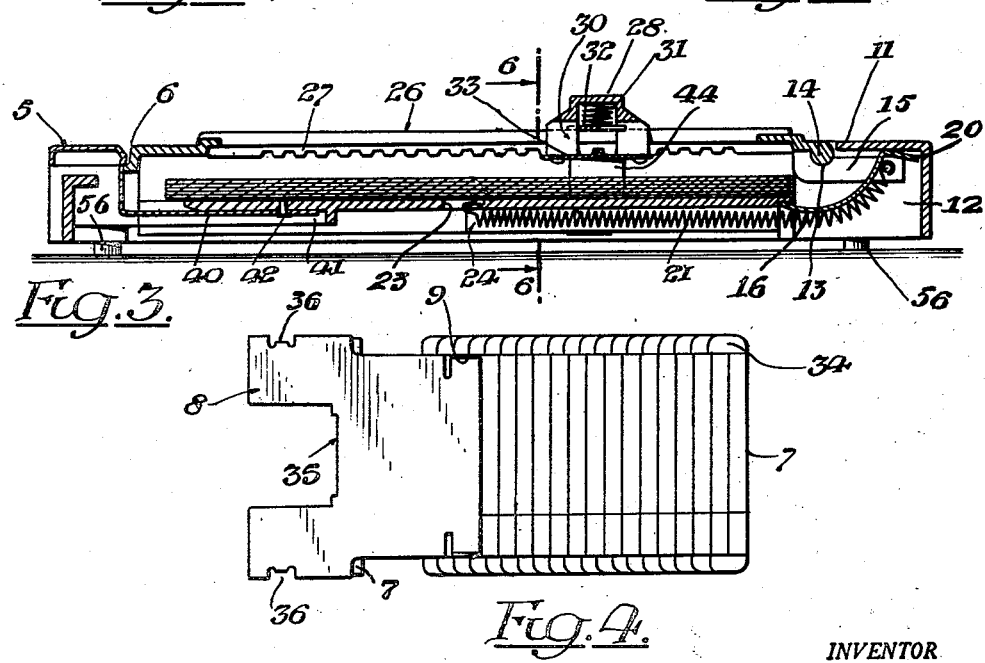
Figure 3 is a longitudinal, vertical, cross-section taken on the plane of the line 3—3 of Figure 1.
Figure 4 is a bottom plan view of the holder for the index sheets and the pad of index sheets therein.
Figure 9:
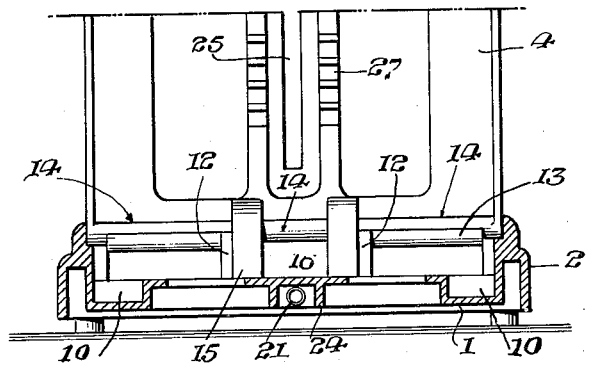
Figure 9 is a fragmentary cross-sectional view of the list finder taken on the plane of the line 9—9 of Figure 7. In this view the cover is in its open position so that the view shows the method of forming detenting surfaces on the under side of the cover.

The pad of index sheets generally designated 7 (Figure 4) is held in a holder 8, which holder is provided with depending ears 9 which fasten the holder into the base with the sheets lying on the central bottom area of the base and projecting over the grooves 10 formed at the sides of the central area of the base 1.

At the rear end of the base 1 there is formed integrally with the rim 2 and extending forwardly for a short distance, a ledge like member 11 which is, in effect, a rearward extension of the cover 4 when that cover is in closed position. Formed integrally with the base 1 and the rearward portions of the rim 2, as well as the ledge 11, are depending ribs 12 which are located centrally of the rear of the base and spaced apart, these ribs forming guide members for a hinging portion of the cover which will shortly be described. The forward edge of the ledge 11 is depressed below the remainder of the ledge and given a concave formation 13, this concave forwardly extending portion being broken away at the center between the ribs 12 and thus extending outwardly from each rib 12 to the rim 2.

Figure 10:
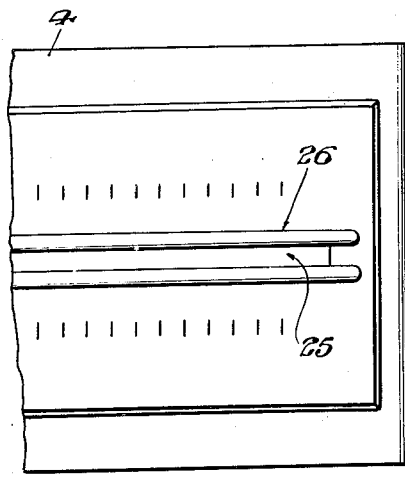
Figure 10 is a fragmentary top plan view of the cover for the list finder.
Figure 11:
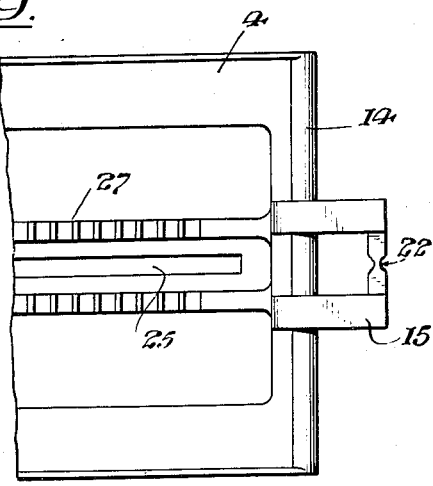
Figure 11 is a bottom plan view of the cover of Figure 10.
Figure 13:
Figure 13 is a perspective view of the saddle member which holds the cover in position for pivotal movement with respect to the base.

The cover 4 is formed at its rear edge with a rounded portion 14 which mates with the concave edges 13 and forms a pivotal knife edge type connection or hinge between the base and cover. The cover 4 is provided with the U-shaped member 15, illustrated particularly in Figures 10 and 11, which member extends rearwardly from the cover and the main portion of which lies slightly below the plane of the cover 4. Member 15 extends rearwardly between the two ribs 12 being held in position by means of a saddle 16 (Figure 13) one end of which seats in a groove 17 in a thickened portion 18 of a depending rib 19 formed integrally with the base 1. The other end of the saddle member 16 is bent over, as shown at 20, and seats against the undersurface of the ledge 11. The saddle member 16 has the form of a quarter circle and thus after being inserted into the base as described above and through the U-shaped member 15 of the cover 4 holds the cover in position with the rounded edge 14 in contact with the concave portion 13 of the ledge 11. Thus these elements form a pivotal connection between the base 1 and cover 4 of the device.

A coil spring 21 is fastened at one end in the groove 22 of the crossbar of the U-shaped member 15 and extends in contact with the curved portion of the saddle member 16 and forwardly being fastened at its other end to the base 1 at approximately the center thereof, this fastening being by means of a hook member on the end of the spring which engages a hole 23 in the base 1. The spring 21 is held in position transversely of the underside of the base 1 by means of depending ribs 24 formed integrally with the base. The depending ribs 24 are reinforced by means of a transversely extending rib 24a formed integrally with the base 1.

It will be seen from the above description that the spring 21 in addition to urging the cover towards its open position likewise serves to hold the saddle member 16 in its position as already described.

Cover member 4 is provided with a slot 25 extending longitudinally thereof along its center line. On either side of this slot on the upper surface of the cover is a ridge 26 on which an operating button is positioned for sliding movement as will be hereinafter described. On either side of the undersurface of the cover a ridge is also formed, these ridges, however, being provided with tooth-like members 27 with which the operating button cooperates in a manner shortly to be described in order that the button may be detented and held in a selected position.

The operating button which is positioned for sliding movement along the slot 25 is shown in detail in Figure 8. This button comprises the button member proper 28 which is provided with a cavity 29 in its undersurface as well as with the downwardly extending projections 30 which extend through the slot 25. In the cavity 29 there is placed a small coil spring 31, this spring being compressed between the upper face of the cavity 29 and a washer 32 which makes contact with and is supported by the ridges 26. A member 33 extends across the bottom of the slot 25 and makes contact with the teeth 27 formed on the ridge portions of the underside of the slot. Member 33, as will hereinafter appear, cooperates with the pile or stack of index cards held in the well of the base 1 and selects the particular card which is exposed to view in accordance with the position of the button 28. The spring 31 constantly urges the operating button upwardly and thus urges the member 33 upwardly into contact with the teeth 27 thereby assuring the retention of the button 28 and member 33 in a preset position.

The stack of cards 7 is composed of a plurality of cards each having an index tab 34 on each side. These index tabs are of progressively greater longitudinal dimension from the top of the stack downwardly and the tab portions of the cards extend over the grooved side portions 10 of the central cavity in a manner already described.

The cards 7 are held in a holder 8, the cards and the holder being provided with a cutout 35 at their rear edges in order to avoid interference with the U-shaped member 15 and with the depending ribs 12 already described. Each card of the stack is provided with a notch 35a in each of its side walls towards the rear, these notches cooperating with the bent over portions 36 of the side walls of the holder 8. These sheets or cards may be very readily inserted in the holder by merely bending the sheets into a convex form and then inserting them in the holder with the notches positioned under the bent over lugs 36. The cards are held in position on the holder 8 by means of the bent over lugs 36, already described, as well as by the bent up edges 37 (see Figure 12).

After the cards have been inserted in the holder 8, this holder is in turn positioned within the well or cavity of the base 1 with the rearward ends of the holder and of the cards lying under the ledge 11 and between the outside walls of the rim portion 2 of the base and the ribs 12. The card holder is held in position by means of the downwardly extending ears 9 which pass through slots 38 in the bottom of the base 1 and grip the sides of these slots. Finger holes 39 are provided in the base, as shown particularly in Figure 7, in order to render it easy to remove the card holder when desired, it being only necessary to press against the bottom of the card holder 8 and thus release the ears 9 from the slots 38 and permit removal of the card holder and the card stack thereon.

The latch 5 previously mentioned is formed from spring material being bent into the shape of an L and having the button proper 5 integral therewith and mounted at the upper end of the L. The other end of the spring member which is designated 40 extends beneath the central portion of the base between two depending ribs 41 and is fastened to the base in any suitable manner, as, for example, by means of the rivet 42. The latch member 5 is provided with a curved portion 43 which cooperates with the projections 6 on the cover 4 already mentioned and thus normally holds the cover in its closed position.

The selection of the cards is effected, as has been described, by moving the selecting or operating button 28 along the slot 25 to a preselected position. Since the member 33 is provided with depending arms 44 which extend downwardly and then inwardly beneath the index tab portions 34 of the card stack 7, the position of the button 28 will determine the number of cards which are to be carried upwardly with the cover as it moves subsequent to release by the latch member 5. As is indicated particularly at 45 in Figure 5, the cards are scored along lines successively greater distances from the rear as considered from the top downwardly. Thus a proper pivot point is provided for the rotation of each card about its own score line and, as described, the selected card may be exposed to view by causing all the cards above it to be rotated about their respective score lines and carried upwardly with the cover.

Figure 12:
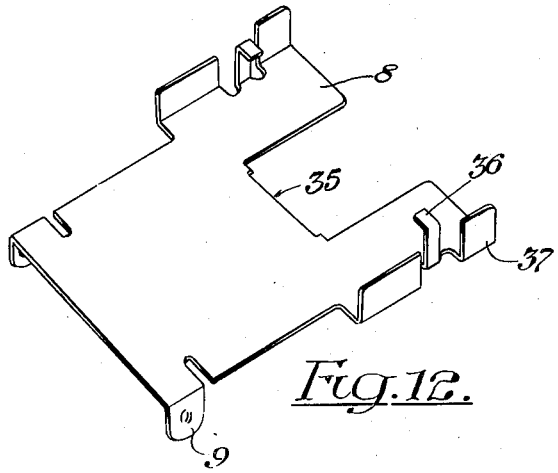
Figure 12 is a perspective view of the holder for the index pad.
Figure 14:
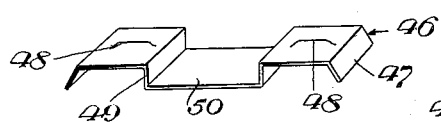
Figure 14 is a perspective view of a device for holding a pack of index sheets within the base, this device being an alternative to that of Figure 12.
Figure 15:
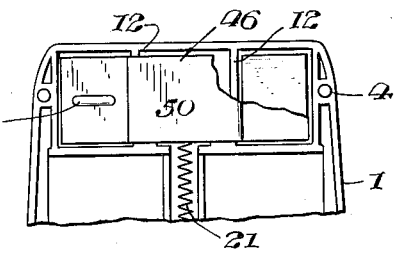
Figure 15 is a fragmentary bottom view of the base of the index showing the device of Figure 14 in place.

Figures 14 and 15 illustrate another method of holding the pack of index sheets 7 in proper position in the cavity 3 of the base 1. When this fastening means is utilized the metal device 8 of Figure 12 is dispensed with and the sheets are not notched to accommodate the lugs 36 but are straight along their rearward side edges.

The device of Figure 14 comprises a strip of somewhat resilient metal 46 which is bent into the shape illustrated in Figure 14 being provided with the angled flanges 47 which, as will apear, are adapted to grip the sides of the base 1 to hold this resilient member 46 and the sheets thereon in proper position. Also the metal retainer 46 is provided with the raised areas 48 in order to more firmly grip the sheets to hold them in position.

The device 46 is inserted in the rear of the base from the underside thereof in such manner that the sides 49 of the depressed central area 50 lie on the outer edges of the two ribs 12 and thus the raised areas press against the lowermost sheet of a stack of sheets which is inserted into the base with the rearward edges lying in the two outer rectangular spaces. The pack of sheets is thus held between the raised areas 48 of the member 46 and the depressed portion 13 of the forwardly extending ledge 11. By the means described the pack of sheets is very readily held in its proper position in the base 1 and the necessity for the member 8 as well as the holes 39 and the slots 38 is dispensed with. Additionally, as can readily be seen, the manufacture of the piece 46 involves considerably less expense than is true of the member 8 so that the use of member 46 reduces the cost of the device both as respects the base and as respects the member itself.

Figure 16:
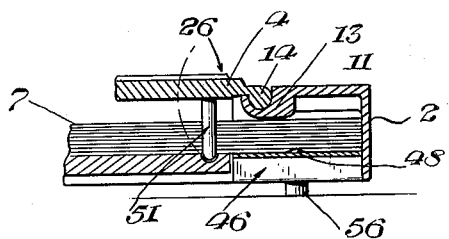
Figure 16 is a fragmentary longitudinal cross-section of the index showing one mode of assuring the correct placement of the index sheets when the holding device of Figure 14 is utilized.

Due to the fact that when member 46 is utilized the sheets are held only by the gripping effect produced by the positioning of member 46 within the cavities at the rearward portion of the base and resting against the ribs 12, there is a possibility that the sheets will move forwardly and thus get out of alignment. One mode of preventing this result is illustrated in Figure 16. As shown in this figure, the cover member 4 is provided with pins or resilient members 51 one on either side thereof near the rearward edge, these pins moving with the cover through an arc, as indicated by the dash line, about the center of the extension 14 of the cover 4. The pins 51 lie against the edges of the tab cutouts in the sheet 7, the sheets being cut so that although the score lines across them lie progressively further to the rear from the bottom of the stack upwardly, the edges of these cutouts are even. Thus as the cover 4 is closed the pins acting against the edges of the cutouts cause the sheets to move rearwardly against the rear portion of the rim 2. Therefore, whenever the slider 28 is moved the sheets are in proper register so that the desired tab 34 is selected.

Figure 17:
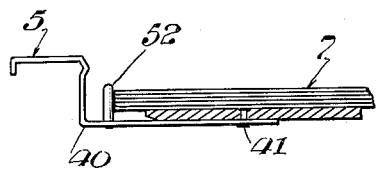
Figure 17 is a fragmentary cross-sectional view of a portion of the index showing the mode of utilizing the latch member to assure correct position of the sheets in the index.

A further mode of achieving the same result as is achieved by the pins 51 is illustrated in Figure 17. In this instance a pin 52 is fastened to the latch member 40 near the forward edge thereof, this pin being adapted to move against the forward edges of the sheets 7 and thus cause them to be moved rearwardly against the rearward edge of the rim 2 upon each return of the latch 40 and the operating member 5 to latching position.

Figure 18:
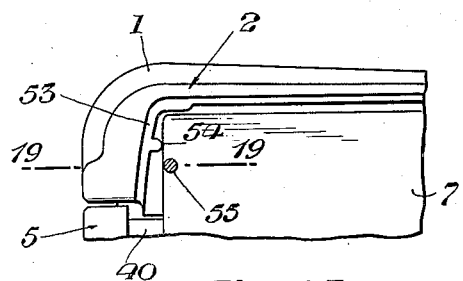
Figure 18 is a fragmentary view of the index with the cover opened, illustrating another mode of assuring correct placement of the sheets.
Figure 19:
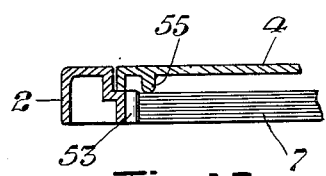
Figure 19 is a fragmentary cross-sectional view taken on the plane of the line 19—19 of Figure 18.

Instead of permitting some play of the sheets within the cavity 3 of the base and correcting any displacement by means of the pin 51 or pin 52, it is possible to slightly alter the form of the base and thus prevent any movement of the sheets. Figures 18 and 19 illustrate one mode in which the base cavity 3 may be formed to prevent such movement of the sheets. In this instance, the ledge 53 with which the base 1 is provided and on which the depending edge of the cover 4 seats is provided with a pair of generally cylindrical projections 54 one near either side which bear against the forward edges of the sheets 7. In order to prevent the sheets 7 from moving forwardly above the projection 53, a pair of pins 55 formed integrally with the cover 4 are provided, these pins forcing the sheets down in such a manner as to cause them to rest against the projections 55 and prevent any movement whatsoever.

Figure 20:
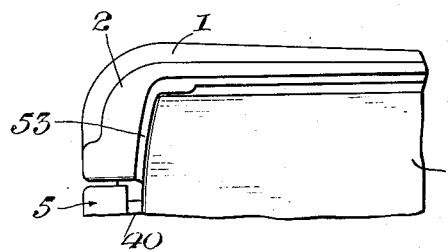
Figure 20 is a view similar to Figure 18 illustrating a further modification of the conformation of the index base in order to assure correct positioning of the index sheets.
Figure 21:
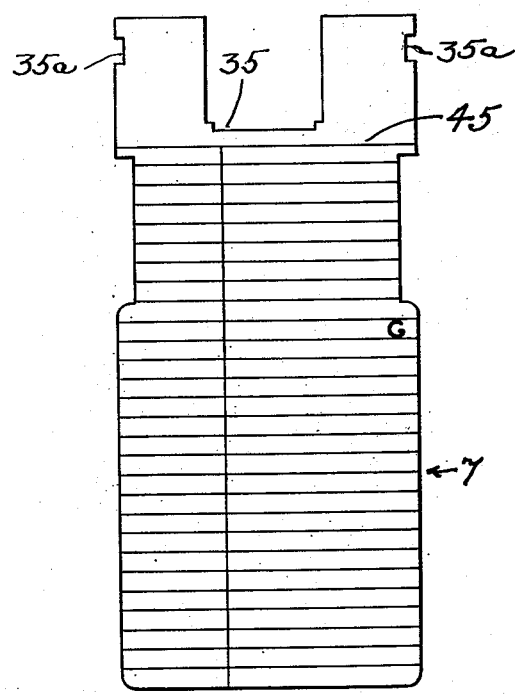
Figure 21 is a top plan view of a single sheet of the pack of sheets utilized in the index.

The same result as was achieved by use of the projections 54 is secured in another manner, as shown in Figure 20. Here the cover is again provided with the pins 55 but instead of providing the cylindrical projections 54 on the ledge 53 the forward edges of the sheets are made to conform to the shape of the ledge 53. Clearly this prevents any movement of the sheets since the pins 55 cause the sheets to be held beneath the upper edge of the ledge 53 during movement of the slider 28 and thus the sheets cannot be moved except in the unusual event of accidental dropping of the device while the cover 4 is open.

In order to prevent the device from scratching or marking the surface on which it may rest, the base 1 is provided with small cavities into which pieces of suitable material such as rubber or felt may be inserted to act as feet 56 to prevent such marking.

While I have described a preferred form of my invention, it will be understood that various modifications are possible and I do not desire, therefore, to be limited by the foregoing description but solely by the scope of the claims granted me.

What is claimed is:

1. In the list finder of the class described, in combination, a base of generally rectangular form, having a rim integral therewith and forming a well for a pack of indexed sheets, a cover fitting over said sheets, said cover having a downwardly extending rounded surface at the rear edge thereof, a convex surface on the rear of the rim of said base, said convex surface cooperating with said rounded surface of said cover to form a hinge for said cover, and means for holding said cover surface against said base rim surface.

2. In the list finder of the class described, in combination, a base of generally rectangular form, having a rim integral therewith, forming a well for a pack of indexed sheets, a cover fitting over said sheets, said cover having a downwardly extending rounded surface at the rear edge thereof, a convex surface formed on the upper edge of the rear of the rim of said base cooperating with said rounded surface of said cover to form a hinge for said cover, a U-shaped member extending rearwardly from said cover at the center thereof, and a saddle member mounted in the base and extending through the said U-shaped member to hold the said rounded surface of the cover against said convex surface of the said ledge.

3. In the list finder of the class described, in combination, a base of generally rectangular form, having a rim integral therewith forming a well for a pack of index sheets, a cover fitting over said sheets, said cover having a downwardly extending rounded surface at the rear edge thereof, a ledge formed on the rear of the rim of said base, said ledge extending forwardly and terminating in a convex surface cooperating with said rounded surface of said cover to form a hinge for said cover, a U-shaped member extending rearwardly from said cover at the center thereof, a saddle member mounted in the base and extending through the said U-shaped member to hold the said rounded surface of the cover against the said convex surface of the said ledge, and a coil spring fixed to the crossbar of said U-shaped member, said spring extending forwardly and in contact with said saddle member and having its other end fixed to said base, whereby said spring biases said cover to open position.

4. In a list finder of the class described, in combination, a base having an integral, upstanding rim, said base being generally rectangular, a cover hinged to said base, said hinge comprising a convex surface on the rear of said cover and a concave surface formed in a forwardly extending ledge integral with said rim, said ledge lying substantially in the plane of said cover, a pair of ribs formed integral with the said ledge and the said rim, said ribs being spaced apart and lying one on either side of the center line of said device, a U-shaped member formed integral with said cover, and extending rearwardly between said ribs and means cooperating with said U-shaped member for holding said convex portion of said cover in contact with said concave portion of said ledge.

5. In a list finder of the class described, in combination, a base having an integral upstanding rim, said base being generally rectangular, a cover hinged to said base, said hinge comprising a convex surface formed on the rear of said cover and a concave surface formed in a forwardly extending ledge integral with said rim, said ledge lying substantially in the plane of said cover, a pair of ribs formed integral with the said ledge and in the said rim, said ribs being spaced apart and lying one on either side of the center line of said device, a U-shaped member formed integral with said cover and extending rearwardly between said ribs, means cooperating with said U-shaped member for holding said convex portion of said cover in contact with said concave portion of said ledge to form the hinge between said base and said cover, a rib extending across the base adjacent the forward edge of said first mentioned ribs, an open slot in said last mentioned rib, and a saddle member having the configuration of a 90° circle arc, said saddle member having one end mounted in said slot and the opposite end bent over and bearing against the under surface of said ledge at the rear thereof, said saddle member extending through said U-shaped member, and between said first mentioned ribs, and serving to hold said convex surface of said cover against the said concave surface of said ledge.

6. In a list finder of the class described in combination, a base having an integral upstanding rim, said base being generally rectangular, a cover hinged to said base, said hinge comprising a convex surface across the rear edge of said cover and a concave surface formed in a forwardly extending ledge integral with said ribs, said ledge lying substantially in the plane of said cover, a pair of ribs formed integral with the said ledge and the said rim, said ribs being spaced apart and lying one on either side of the center line of said device, a U-shaped member formed integral with said cover and extending rearwardly between said ribs, means cooperating with said U-shaped member for holding said convex portion of said cover in contact with said concave portion of said ledge to form the hinge between said base and said cover, a rib extending across the base adjacent the forward edge of said first mentioned ribs, an open slot in said last mentioned rib, a saddle member having the configuration of a 90° circle arc, said saddle member having one end mounted in said slot and the opposite end bent over and bearing against the under surface of said ledge at the rear thereof, said saddle member extending through said U-shaped member, and between said first mentioned ribs, and serving to hold said convex surface of said cover against the said concave surface of said ledge, a coil spring having one end fixed to the cross bar of said U-shaped member, means anchoring the other end of said coil spring to said base adjacent the center thereof, said spring extending over said saddle member and holding said saddle member in position, and webs extending downwardly from the central portion of said base, one on either side of said coil spring to protect said spring and hold it in its proper position.

7. In a list finder of the class described, in combination, a base having an upstanding rim thereabout, and forming a central well having a groove on either side thereof, a cover hingedly mounted on said base, and a pack of tabbed index cards mounted in said well, with their edges extending over said grooves, and a holder in which said index cards are mounted said holder having downwardly extending ears which extend through holes in said base and position said index card holder.

8. In a list finder of the class described, in combination, a base, an upstanding rim integral with said base forming a cavity of generally rectangular shape having longitudinal grooves of greater depth than the cavity along the edges thereof, a ledge extending forwardly from the rear wall of said rim, a pair of ribs extending forwardly from the rear wall of said rim and made integral with said rim and said ledge, said ribs being spaced on either side of the center line of the list finder, and a holder for tabbed index sheets, said holder comprising a sheet metal stamping having upwardly extending ears adapted to hold a pack of index cards thereon, and having downwardly extending ears adapted to hold said holder in position on said index base, said stamping having rearwardly extending projections formed to fit within the spaces between the said ribs and the rearward side portions of said upstanding rim.

9. In a list finding device of the class described in combination, a base having an upstanding rim forming a central cavity, said cavity having its longitudinal edge portions of greater depth than the remainder forming grooves, a cover hingedly connected to said base by means of a knife edge hinge, a coil spring for biasing said cover to its open position, a slot extending longitudinally of said cover, a card selecting member mounted in said slot, said member having downwardly extending portions terminating in inwardly bent ends, a pack of tabbed index cards mounted in said cavity with their edges extending over the longitudinal portion of the cavity of greater depth and lying above the said bent terminating ends of said card selecting member, and spring pressed means for holding said card selecting member in a selected position along said slot, whereby upon release of the cover to open position, the selected index sheet will be exposed to view.

10. In a list finder of the class described and having a base with a cavity therein and a cover hingedly secured thereto, in combination, a pack of cards mounted on said base each card being scored to permit oscillatory movement of the free end thereof, means mounted on said cover for selecting the number of said index cards to be pivotally moved with said cover, said means comprising a longitudinal slot in said cover, the edges of said slot being raised above the plane of the cover, a button having depending portions extending through said slot, a cavity in said button, a coil spring mounted in said cavity, a washer extending across said slot between said downwardly depending members, and serving to compress said coil spring between said button and said washer and a card selecting member fixed to said downwardly extending members, said card selecting member extending transversely of said cover and having downwardly extending portions adjacent its ends, said downwardly extending portions terminating in inwardly extending portions which cooperate with the tabbed index cards.

11. In a list finder of the class described, and having a base with a cavity therein, and a cover hingedly secured thereto, a pack of cards mounted on said base, each card being scored to permit movement of the free end thereof, in combination, means mounted on said cover for selecting the number of said index cards to be pivotally moved with said cover, said means comprising a longitudinal slot in said cover, the edges of said slot being raised above the plane of the cover, a button having depending portions extending through said slot, a cavity in said button, a coil spring mounted in said cavity, a washer extending across said slot between said downwardly depending members, and serving to compress said coil spring between said button and said washer, a card selecting member fixed to said downwardly extending members, said card selecting member extending transversely of said cover and having downwardly extending portions adjacent its ends, said downwardly extending portions terminating in inwardly extending portions which cooperate with the tabbed index cards, toothed ridges on the underside of said slot adjacent the edges thereof, and a rounded central portion of said card selecting member, said portion cooperating with said teeth and forming with said spring pressed button, a means for detenting said card selecting member at a desired position.

12. In a list finder of the class described having a base with a cavity therein, a cover removably hingedly secured thereto and a pack of cards mounted within said cavity, in combination, means for holding the pack of cards in the cavity of the base, said means comprising a rim on said base, a ledge extending forwardly from the rear of said rim, extensions of said cards extending rearwardly beneath said ledge, and a resilient metallic piece fitted within the rearward portion of said base from beneath, said member cooperating with said ledge to hold the sheets therebetween.

13. In a list finder of the class described having a base with a cavity therein, a cover hingedly secured thereto and a pack of cards mounted on said base within said cavity, in combination, a pair of pins fixed to the underside of the cover adjacent the side edges thereof, and notches in said cards forming index tabs, said pins striking against the enlarged rear edges of said sheets to thereby move said cards into position upon each closure of the cover.

14. In a list finder of the class described having a base with a cavity therein, a cover hingedly secured thereto and a pack of cards mounted within the cavity of said base, in combination, latch means for holding said cover in its closed position, and means mounted on said latch members for making contact with the forward edges of said cards as the latch is moved to latching position, said means thereby serving to position said cards in registration upon each latch operation of said latch member.

15. In a list finder of the class described having a base with a cavity therein, a cover hingedly secured to said base and a pack of cards mounted within said cavity, in combination, a projection extending into said cavity from the forward edge of said base, said projection defining the cavity and causing registration of the sheets, and means projecting downwardly from the forward edge of the cover to cause said sheets to bear against said projecting means.

ALBERT EDWARD POLLOCK.

REFERENCES CITED

The following references are of record in the file of this patent:

UNITED STATES PATENTS

| Number | Name | Date |
|---|---|---|
| 811,489 | Dunwell | Jan. 30, 1906 |
| 1,094,716 | Hill | Apr. 28, 1914 |
| 1,637,485 | Hiering | Aug. 2, 1927 |
| 2,115,537 | Peter | Apr. 26, 1938 |
| 2,141,761 | Pollock | Dec. 27, 1938 |

FOREIGN PATENTS

| Number | Country | Date |
|---|---|---|
| 681,977 | Germany | Oct. 5, 1939 |